US009609501B2

(12) United States Patent
Joshi et al.

(10) Patent No.: US 9,609,501 B2
(45) Date of Patent: *Mar. 28, 2017

(54) MANAGED ACCESS TO MOBILE ENDPOINTS

(71) Applicant: Cisco Technology, Inc., San Jose, CA (US)

(72) Inventors: Kiritkumar B. Joshi, Cupertino, CA (US); Viren K. Malaviya, Cupertino, CA (US); Anand Oswal, Pleasanton, CA (US); Chandrodaya Prasad, Santa Clara, CA (US); Sachin G. Gorde, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 196 days.

This patent is subject to a terminal disclaimer.

(21) Appl. No.: 14/542,227

(22) Filed: Nov. 14, 2014

(65) Prior Publication Data

US 2015/0078202 A1    Mar. 19, 2015

Related U.S. Application Data

(63) Continuation of application No. 13/291,847, filed on Nov. 8, 2011, now Pat. No. 8,891,552.

(51) Int. Cl.
H04L 12/28       (2006.01)
H04W 8/00        (2009.01)
(Continued)

(52) U.S. Cl.
CPC .......... H04W 8/005 (2013.01); H04L 61/1511 (2013.01); H04L 61/2007 (2013.01);
(Continued)

(58) Field of Classification Search
USPC .............. 370/329, 401, 389, 466, 254, 278
See application file for complete search history.

(56) References Cited

U.S. PATENT DOCUMENTS 7,631,086 B2    12/2009  Carmello et al.
8,228,861 B1 *   7/2012  Nix ..................... H04W 36/00
                                                            370/329

(Continued)

FOREIGN PATENT DOCUMENTS

CN          1579081 A       2/2005

OTHER PUBLICATIONS

International Preliminary Report on Patentability from corresponding International application No. PCT/US2012/058593, 7pgs., May 22, 2014.
(Continued)

Primary Examiner — John Pezzlo

(57) ABSTRACT

A network device may be configured to provide a gateway between a remote host and a mobile node using multiple interconnection protocols. The network device may include database circuitry configured to query a database for a first or second address of a mobile node using a domain name of the mobile node. The addresses may be associated with different interconnection protocols. The network device may include communication interface circuitry configured to receive a request from a remote host to communicate with the mobile node. The request may include the domain name. The interface circuitry may also be configured to transmit a message indicating the request using the first address, and transmit the second address to the remote host so that the remote host can communicate with the mobile node using the second address. The message may include a command to establish a data bearer through the second address.

20 Claims, 5 Drawing Sheets

(51) Int. Cl.
H04L 29/12 (2006.01)
H04L 29/06 (2006.01)
H04W 12/08 (2009.01)
H04J 1/16 (2006.01)

(52) U.S. Cl.
CPC ...... H04L 61/2076 (2013.01); H04L 61/6086 (2013.01); H04L 63/101 (2013.01); H04L 65/102 (2013.01); H04L 65/1006 (2013.01); H04L 65/1016 (2013.01); H04W 12/08 (2013.01)

(56) References Cited

U.S. PATENT DOCUMENTS

| | | | |
|---|---|---|---|
| 2002/0112076 A1* | 8/2002 | Rueda | H04L 12/14 709/245 |
| 2005/0266842 A1* | 12/2005 | Nasielski | H04L 63/08 455/432.1 |
| 2009/0210519 A1 | 8/2009 | Zill et al. | |
| 2010/0077023 A1 | 3/2010 | Eriksson | |
| 2011/0153807 A1* | 6/2011 | Vicisano | H04L 29/12066 709/224 |
| 2011/0153827 A1* | 6/2011 | Yengalasetti | G06F 9/5044 709/226 |

OTHER PUBLICATIONS

International Search Report and Written Opinion from corresponding International application No. PCT/US2012/058593, 11pgs., Jan. 24, 2013.

$3^{rd}$ Generation Partnership Project; Technical Specification Group Services and System Aspects; System Improvements for Machine-Type Communications; (Release 11. 3GPP Standard; 3GPP TR 23.88, $3^{rd}$ Generation Partnership Project (3GPP), Mobile Competence Centre; 650 Route Des Lucioles; F-06921 Sophia-Antipolis Cedex; France, vol. SA WG2, No. V1.5.0, Oct. 19, 2011 (Oct. 19, 2011), pp. 1-55, XP050554391 [retrieved on Oct. 19, 2011] Clauses (including sub-clauses): 5.3, 5.8, 6.1, 6.6, 6.18, 6.19, 6.29, 6.39, 6.41, 6.45, 6.46, 6.50.

Qualcomm Incorporated: "User Plane Based Device Triggering", 3GPP Draft; S2-115018, $3^{rd}$ Generation Partnership Project (3GPP), Mobile Competence Centre; 650, Route Des Lucioles; F-06921 Sophia-Antipolis Cedex; France, vol. SA WG2, No. SFO, USA, 20111114-20111118, Nov. 7, 2011 (Nov. 7, 2011), XP050575437, [retrieved on Nov. 7, 2011].

"$3^{rd}$ Generation Partnership Project; Technical Specification Group Services and System Aspects; General Packet Radio Service (GPRS) enhancements for Evolved Universal Terrestrial Radio Access Network (E-UTRAN) access (Release 10)", 3GPP Standard; 3GPP TS 23.401, (3GPP), Mobile Competence Centre; 650, Route Des Lucioles; F-06921 Sophia-Antipolis Cedex; France, vol. SA WG2, No. V10.5.0, Aug. 24, 2011 (Aug. 24, 2011), pp. 1-282, XP050553747, [retrieved on Aug. 24, 2011].

Koodli Cisco Systems R: "Mobile Networks Considerations of IPv6 Deployment; rfc6342.txt", Mobile Networks Considerations for IPV6 Deployment; RFC6342.TXT, Internet Engineering Task Force; Standard, Internet Society (ISOC) 4, Rue Des Falaises CH-12 Geneva, Switzerland, Aug. 1, 2011 (Aug. 1, 2011), pp. 1-17, XP015081255, [retrieved on Aug. 1, 2011] Section 3.1.

English translation of the First Office Action in counterpart Chinese Application No. 201280010308.3, issued Jul. 4, 2016, 5 pages.

* cited by examiner

MANAGED ACCESS TO MOBILE ENDPOINTS

PRIORITY

This is a continuation of U.S. patent application Ser. No. 13/291,847 filed on Nov. 8, 2011, the contents of which are hereby incorporated herein by reference in their entirety.

FIELD

The present disclosure relates to managed access to mobile endpoints including a secure wake-up of offline mobile endpoints.

BACKGROUND

The exhaustion of the address space of the internet protocol version 4 (IPv4) has been a concern for decades. Early predictions warned that IPv4 would have been depleted years ago. In 2011, by some measures, some parts of the world have depleted their IPv4 supply. However, the transition to Internet Protocol Version 6 (IPv6) is just beginning to gain momentum. Until IPv6 becomes pervasive, the use of IPv4 addresses for service delivery will continue to dominate.

The address space of IPv6 has about 3.4.times.10.sup.38 addresses, which provides flexibility in address allocation and theoretically sufficient for every person on earth to be allocated millions of unique addresses. A large number of people may access the Internet using several devices, each of which may have a unique address under IPv6 rather than relying on network address translation, in which all of the devices in a local network appear to have the same address to the rest of the Internet. However, until the infrastructure of the Internet has transitioned to IPv6, services relying on IPv4 will remain ubiquitous. Thus, mobile devices may include dual IPv4 and IPv6 functionality. IPv4 addresses cannot be permanently assigned to every device, however, the IPv6 functionality, may be leveraged to expand the reach of IPv4 services.

DETAILED DESCRIPTION

Overview

Figure 1:
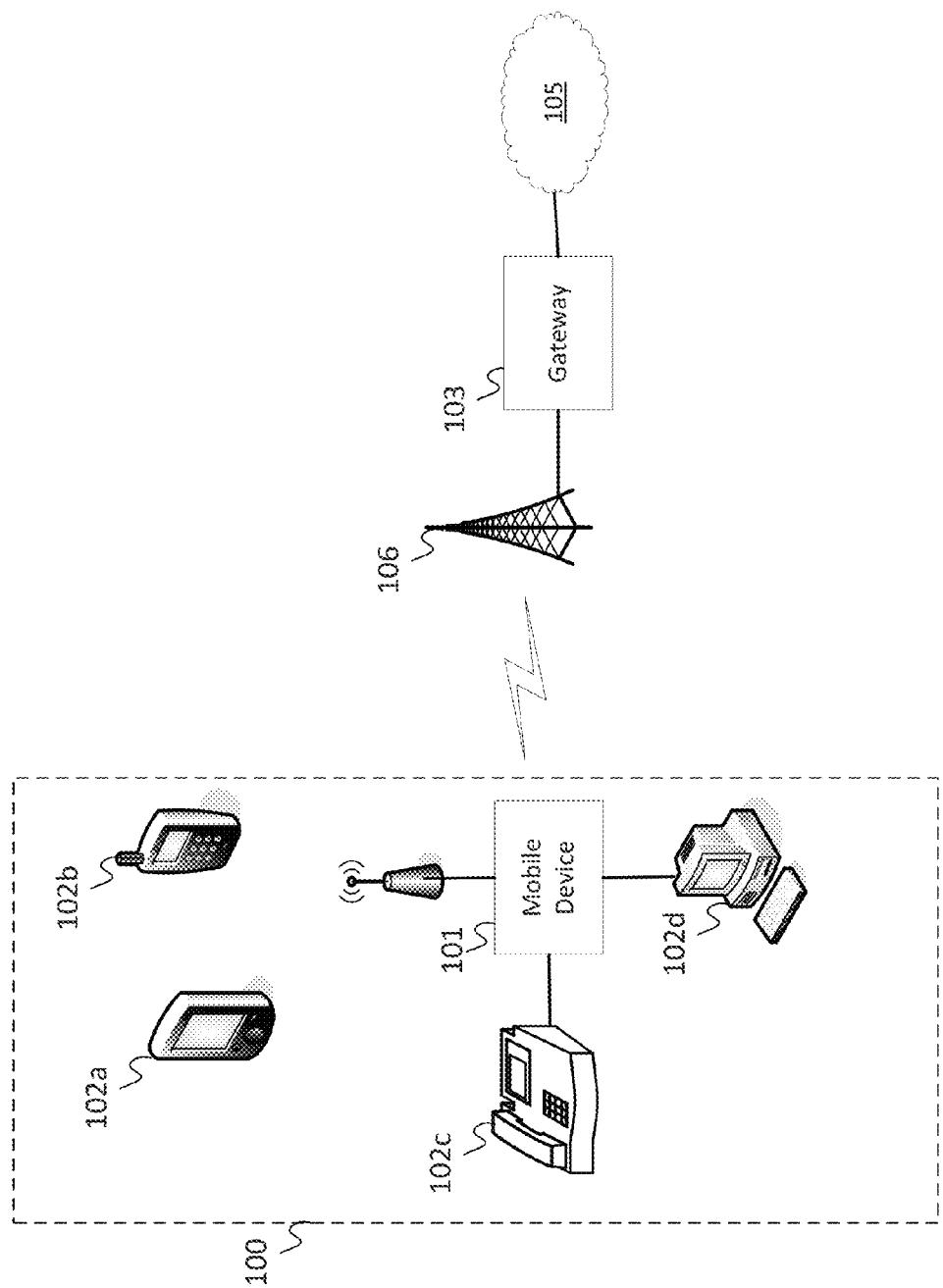
FIG. 1 illustrates a first embodiment of a communication system for managed access to mobile endpoints.

In one aspect, a method includes receiving a request originating from a remote host and querying a database using the domain name of a mobile node included in the request for a first address of the mobile node as designated according to a first internet layer protocol. A wake up message is transmitted to the mobile node using the first address. The wake up message includes an identity of the remote host. A second address of the mobile node as designated according to a second internet layer protocol is assigned to the mobile node in response to the wake up message and forwarded to the remote host.

In a second aspect, an apparatus includes a database, a processor, and a communication interface. The database is configured to store at least one domain name associated with a first Internet layer protocol and a second internet layer protocol. The processor is configured to query the database using a domain name based on receipt of a remote host request to receive a first address associated with the first internet layer protocol and configured to generate a wake up message to a mobile node using the first address. The wake up message includes a command to establish a data bearer for the second internet layer protocol. The communication interface is configured to transmit the wake up message to the mobile node and to receive a second address of the mobile node designated according to the second internet layer protocol.

In a third aspect, a computer readable medium includes instructions to identify a domain name from a communication request originating at a remote router and naming a mobile router, query a database using the domain name for an IPv6 address of the mobile router, transmit a wake up message to the mobile router using the IPv6 address, receive an IPv4 address of the mobile router, and forward the IPv4 address to the remote router.

Example Embodiments

The first three generations of wireless telephony or telecommunication networks rely on circuit switching (CS). CS requires that two networks maintain a dedicated communications channel, which may be referred to as a circuit. The dedicated communications channel is an electrical connection that cannot be used by other callers. The first generation of wireless telephony (1G) networks was based on analog systems. The second generation of wireless telephony (2G) added digital techniques including encryption but remain circuit switched communication. The third generation of wireless telephony (3G) and some intermediate technologies (e.g., 2.5G) are based on two parallel infrastructures consisting of circuit switched and packet switched network domains.

The fourth generation of wireless telephony (4G), however, is based on packet switching only, which requires all services provided over cellular networks to eventually be compatible with packet switched communication. Because exhaustion of internet protocol version 4 (IPv4) addresses was projected to occur before the deployment of 4G networks, internet protocol version 6 (IPv6) is fully supported by 4G infrastructures, and carriers may require all 4G enabled devices to support IPv6. However, current projections predict that IPv4 services will be prevalent worldwide for many years to come and most mobile device will support both IPv4 and IPv6.

As described in the following embodiments the dual support of IPv4 and IPv6 in many mobile devices permits an enhanced managed access to the mobile devices, in which the IPv6 connectivity is leveraged for use in IPv4 services. In 1G, 2G, and 3G networks, an incoming voice call or a short message service (SMS) message on a mobile device are the only always-on services. After the mobile device is turned on, the mobile device logically connects to the network and, after a short amount of time, an indicator (e.g., a green light) informs the user that the mobile device can either originate or receive calls and SMS messages. However, in the data world of 3G and earlier technologies, a service or application must be initiated by the user of the mobile device in order to receive incoming data. There is no always-on "phone number" in the data world.

On the other hand, 4G networks, using unique addresses for every device, allow always-on connectivity in IPv6 data services. The always-on connectivity of IPv6 data services may be harnessed to wake up a mobile device so that the mobile device may receive other data services (e.g., IPv4 data services).

FIG. 1 illustrates a first embodiment of a communication system for managed access to mobile endpoints. The communication system includes a local area network 100, a gateway 103, and a remote network 105. The remote network 105 may be the Internet, a private network, or any network including at least one remote host. The remote host may be a router or an endpoint such as a computer or a server.

The local area network 100 includes a mobile device 101 and a plurality of endpoints 102. The mobile device 101 may be a mobile router, a mobile access point, a cellular router, or any device including a cellular data modem. For example, the mobile device 101 may be any device including a subscriber identity, such as a subscriber identity module (SIM) card. The SIM card is an integrated circuit that stores a service subscriber key that uniquely identifies the mobile device 101. An example service subscriber key is the international mobile subscriber identity (IMSI). The SIM card may be removable. One specific example of the mobile device 101 is an Integrated Services Router Generation 2 (ISRG2) manufactured by Cisco Systems of San Jose, Calif. The mobile device 101 may create a mobile hotspot for data communications with the plurality of endpoints 102.

The plurality of endpoints 102 may include wired endpoints and/or wireless endpoints. The wireless endpoints may include, but are not limited to, a tablet computer 102a, a smart phone 102b, a television, a video game system, an electronic reader, a digital photo frame, a digital versatile disc player, a handset, or any wireless device. The wired endpoints may include, but are not limited to a voice over internet (VOiP) phone 102c, a personal computer 102d, a laptop computer, or any wired device include a network interface card. Alternatively, the mobile device 101 may be a single endpoint such as any of the above wireless devices.

The mobile device 101 is in communication with a carrier network 106, including a cellular antenna. The carrier network 106 is a service provider such as a wireless telephony company. The carrier network 106 connects to the network 105 by way of gateway 103.

The gateway 103 receives a request originating from a remote host. The remote host may be any device connected to the network 105 capable of Internet protocol communications. The request may include a unique identifier, such as a domain name of at least one of the endpoints 102 or mobile device 101, referred to collectively as mobile nodes. The mobile device may be any device equipped with cellular communication and packet-switched communication. The unique identifier may, for example, be a fully qualified domain name (FQDN) or absolute domain name. The FQDN specifies an unambiguous and exact location of the mobile node as defined by the domain name system (DNS). Example FQDNs include hostname.example.com and 4085551234.verizon.net. The FQDN of the mobile node is a permanent address that cannot typically be changed. The FQDN is associated with the SIM card and can be transferred between mobile equipment/nodes by removing the SIM card from one device and installing the SIM card in another device.

The remote host may send the request to a public DNS server to resolve the FQDN of the mobile node. The request, through the DNS hierarchy of the Internet, may be forwarded to the corresponding service provider. Ultimately, the request is received at gateway 103. The gateway 103 may act as a dynamic DNS server that automates the discovery and registration of the IP address of the mobile nodes. The gateway 103 is configured to query a database using the FQDN for an address of the mobile node.

If the mobile node is already 'online', the gateway 103 accesses the address of the mobile device as designated according to IPv4 and returns the IPv4 address of the mobile node to the remote host in response to request or in response to the DNS query. The term 'online' means that an appropriate data bearer (i.e. IPv6 bearer) has been established for the mobile node.

If the mobile device is not 'online' when the gateway 103 receives the request or DNS query, the gateway 103 accesses the address of the mobile device as designated according to IPv6 and transmits a wake up message to the mobile node using the IPv6 address. The wake up message includes a command to establish an IPv4 data bearer. The wake up message may also include an identity of the remote host, which may be the source IP address of the remote host. The wake up message may be encrypted using a unique identifier, such as the IMSI of the SIM card of the mobile node. The wake up message may include other useful data such as security data, policy data, or authentication data.

In response to the wake up message, the mobile node and gateway 103 establish an IPv4 data bearer and acquires a second address from the carrier network 106. The second address of the mobile node is an IPv4 address. The gateway 103 records the IPv4 address of the mobile node in the database. The IPv4 address may be recorded as an A type DNS record as defined by RFC 1035. The gateway 103 forwards the second address to the remote host. As result, the remote host may communicate, access, manage, retrieve data, or send commands to the mobile node.

The communication between the remote host and the mobile node may be any type of data service. Many data services such as remote access to a computer, are easily performed using cable, coaxial, satellite, digital subscriber lines, or other 'always on' broadband connections. These data services are now possible using the disclosed embodiments when the endpoint is behind a mobile router. Particularly advantageous scenarios occur where the mobile device is located far from administrators. For example, in a smart grid system, a wireless utility node (utility meter) can be woken up and accessed by a remote server to report utility consumption data related to electricity, water, or another utility. Further, analytic data may be pushed on demand at any time. The mobile node may also be set up and configured remotely. In addition, patches, software, updates, or new configurations may be sent to the mobile node without any initiation, approval, or user presence at the mobile node. Other advantageous implementations may be made in VOiP technologies, in which incoming calls can be received at the mobile node without previously establishing a data bearer for the VOiP. Other applications include vending machines, automobile diagnostics, weather stations, and mesh networks, but any packet switched communication is possible using the described embodiments.

Figure 2:
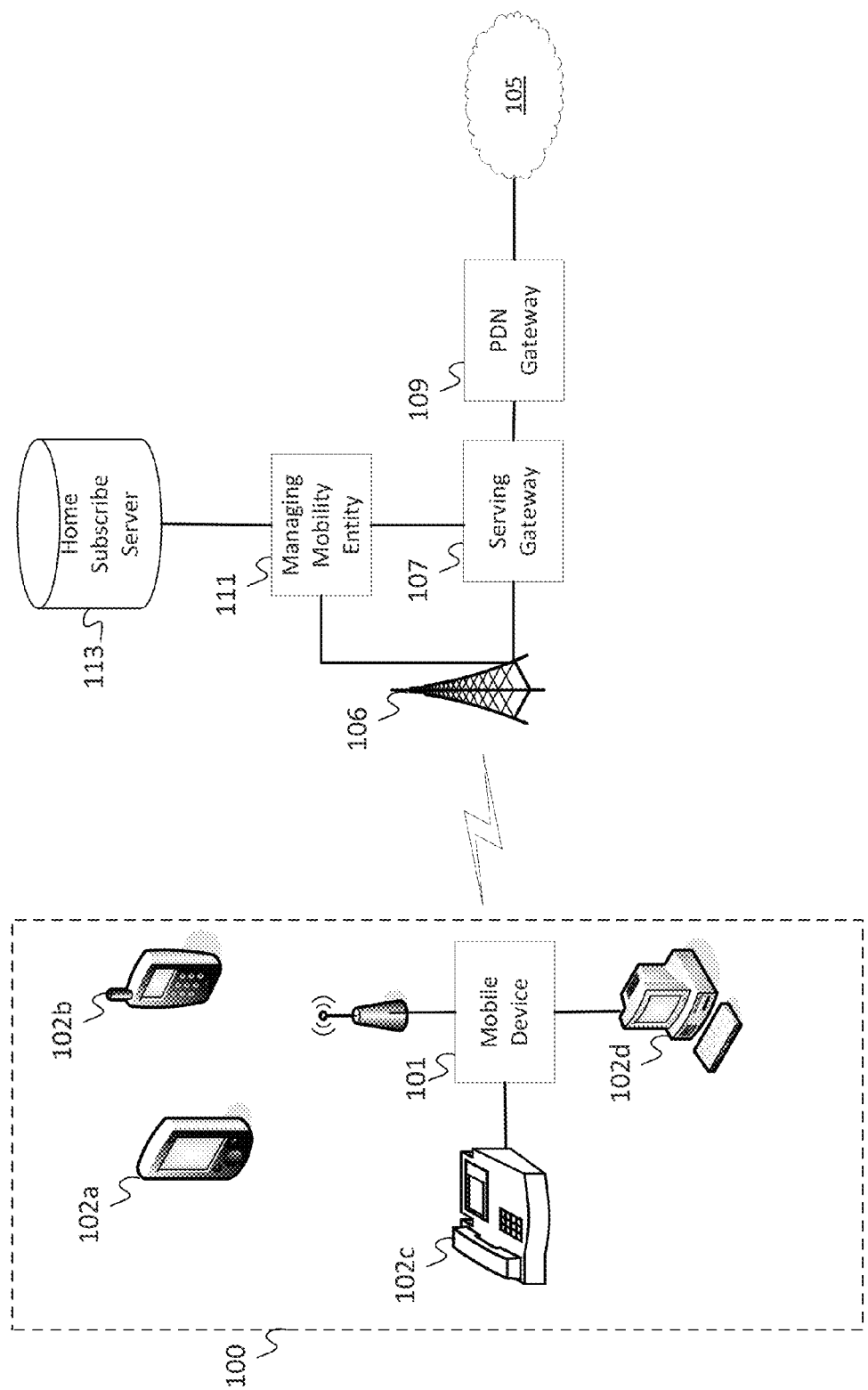
FIG. 2 illustrates a second embodiment of a communication system for managed access to mobile endpoints.

FIG. 2 illustrates a second embodiment of a communication system for managed access to mobile endpoints. The communication system includes a local area network 100, a carrier network 106, a home serving system 113, a managing mobility entity (MME) 111, a serving gateway 107, a packet data network (PDN) gateway 109, and a remote network 105. The carrier network 106, the remote network 105 and the local area network 100 include the features and components described above with respect to FIG. 1.

The communication system of FIG. 2 is a 4G long term evolution (LTE) environment as established and maintained by the 3rd Generation Partnership Project (3GPP). The mobile device 101 may be configured using any suitable radio transmission technology such as global system for mobile communication (GSM), general packet radio service (GPRS), universal mobile communication system (UMTS), or code division multiple access (CDMA). Either of the serving gateway 107 or the PDN gateway 109 may be configured to allow managed access to mobile endpoints, however the following is discussed with respect to the PDN gateway 109. The serving gateway 107 also acts as the mobility anchor for when movement of the mobile node requires a change in base station as defined by 3GPP TS 23.401 (www.3gpp.org/ftp/Specs/html-info/23401.htm).

The home subscribe server 113 includes a database defining subscriber profiles containing subscriber related data for all of the mobile nodes of the carrier network. The subscriber profiles may include subscriber names, a list of permissions, roaming rights, restrictions, type of subscribed services, etc. Further the home subscribe server 113 may include billing data.

The managing mobility entity (MME) 111 is the key control-node for the communication system. The MME authenticates the mobile node by accessing the subscriber profiles from the HSS. The MME tracks the mobile nodes moving from one cellular cell to the next.

Figure 3:
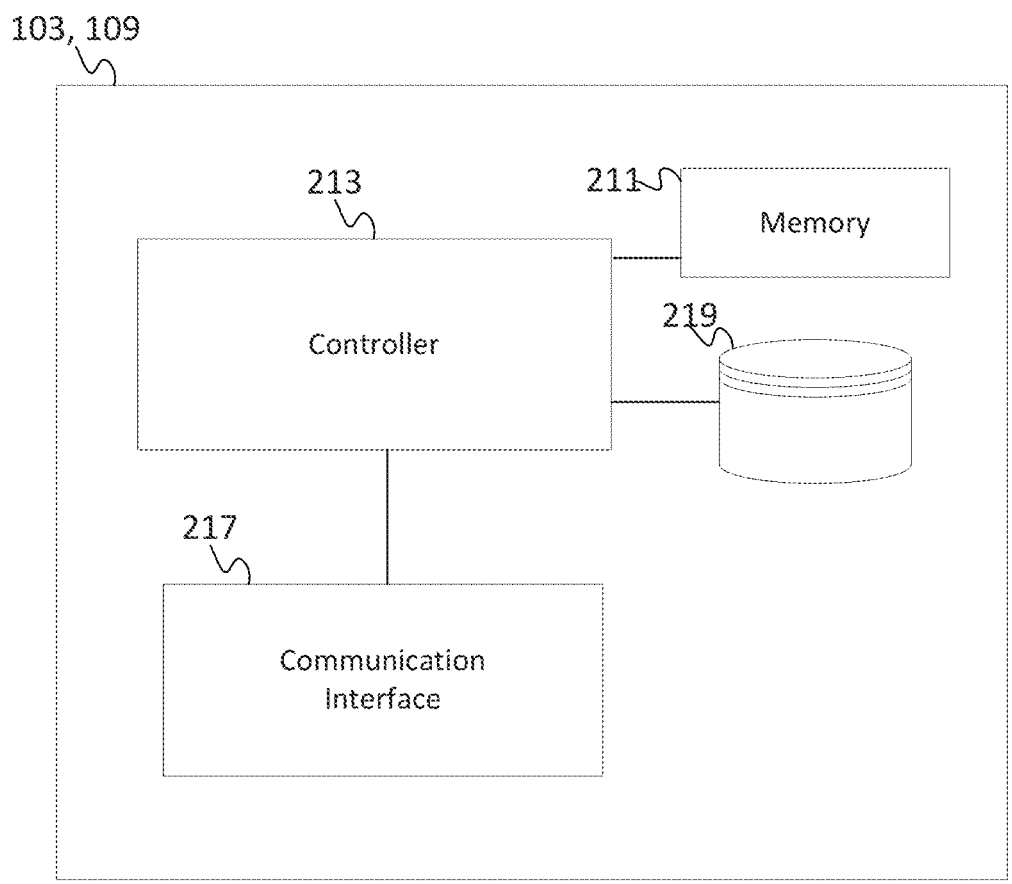
FIG. 3 illustrates an example of the gateway of FIG. 1 or FIG. 2.

FIG. 3 is a detailed view of the gateway 103 or PDN gateway 109, which includes a controller 213, a memory 211, a communication interface 217, and a database 219. Alternatively, the device of FIG. 3 could be any network device including network appliances, servers, routers, gateways, load balancers, firewalls, or any suitable Layer 3 device.

The memory 211 may include a database configured to store at least one domain name associated with a first internet layer protocol and a second internet layer protocol. For example, the at least one domain name may be a unique and unambiguous identity of a mobile node as described by a FQDN. The memory 211 may also include a list of established data bearers for each of the domain names. Each FQDN may be associated with a first data bearer entry (e.g., IPv6 data bearer) and a second data bearer entry (e.g., IPv4 data bearer). If the memory 211 includes an address or other data in either bearer entry, the respective data bearer has been established, which indicates the reachability of the mobile node.

The IPv6 data bearer is an IP multimedia system (IMS) data bearer. IMS is the framework developed by 3GPP for delivering IP multimedia services over cellular networks. The framework is defined by 3GPP TS 23.228 (www.3gpp.org/ftp/Specs/html-info/23228.htm).

The gateway 103 or PDN gateway 109 is a node on the path between the mobile node and the remote host. The remote host initiates communication with the mobile node by generating a remote host request. The remote host request includes the domain name of the mobile node and the source IP address of the remote host. The remote host request may include additional fields, that when applied at the mobile node, may change the operational behavior of the mobile node. These data items may also be sent in a protocol configuration option (PCO) field. The remote host sends the remote host request to a public DNS server or directly to the gateway 103 or PDN gateway 109. If the remote host request is sent to the public DNS server the normal DNS hierarchy takes over and eventually the remote host request is forwarded to the gateway 103 or PDN gateway 109. Therefore, in either scenario the controller 213 receives the remote host request by way of the communication interface 217.

The controller 213 is configured to query the database in the memory 211 using the domain name of the mobile node included in the remote host request in order to check whether the database includes the second address. If the database includes the second address, then a data bearer for IPv4 has already been established. If the IPv4 data bearer has already been established then the controller 213 forwards the second address to the remote host, and communication between the remote host and the mobile node may proceed.

However, if the database does not include the second address, the mobile node must be woken up to establish the IPv4 data bearer. The controller 213 receives a first address associated with the first internet layer protocol (e.g., IPv6) from the database and generates a wake up message including the first address (e.g., IPv6). The wake up message may also include the source IP of the requesting remote host and authentication data.

The communication interface 217 is configured to transmit the wake up message to the mobile node using the first address. The wake up message includes a command to establish a data bearer for the second internet layer protocol (e.g., IPv4). The wake up message may also be a multicast message intended for all or a subset of mobile device 102. The communication interface 217 receives a second address of the mobile node as designated according to the second internet layer protocol (e.g., IPv4).

The controller 213 associates the second address with the domain name by storing the second address to the database in the memory 211. The controller 213 generates a response message including the second address and forwards the response message to the remote host. The remote host now may communicate with the mobile node using the second address and associated data bearer.

The memory 211 may be any known type of volatile memory or a non-volatile memory. The memory 211 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory. The memory 211 may include an optical, magnetic (hard drive) or any other form of data storage device. The memory 211 may be located in a remote device or removable, such as a secure digital (SD) memory card.

The memory 211 may store computer executable instructions for filtering and routing communication session requests. The controller 213 may execute computer executable instructions. The computer executable instructions may be included in computer code. The computer code may be written in any computer language, such as C, C++, C#, Java, Pascal, Visual Basic, Perl, HyperText Markup Language (HTML), JavaScript, assembly language, extensible markup language (XML) and any combination thereof.

The computer code may be stored in one or more tangible media or one or more non-transitory computer readable media for execution by the controller 213. A computer readable medium may include, but is not limited to, a floppy disk, a hard disk, an application specific integrated circuit (ASIC), a compact disk CD, other optical medium, a random access memory (RAM), a read only memory (ROM), a memory chip or card, a memory stick, and other media from which a computer, a processor or other electronic device can read.

The controller 213 may include a general processor, digital signal processor, application specific integrated circuit, field programmable gate array, analog circuit, digital circuit, server processor, combinations thereof, or other now known or later developed processor. The controller 213 may be a single device or combinations of devices, such as associated with a network or distributed processing. Any of various processing strategies may be used, such as multi-processing, multi-tasking, parallel processing, remote processing, centralized processing or the like. The controller 213 may be responsive to or operable to execute instructions stored as part of software, hardware, integrated circuits, firmware, micro-code or the like.

The communication interface 217 may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other or through one or more intermediate entities (e.g., processor, operating system, logic, software). Logical and/or physical communication channels may be used to create an operable connection. As used herein, the phrases "in communication" and "coupled" are defined to mean directly connected to or indirectly connected through one or more intermediate components. Such intermediate components may include both hardware and software based components.

Figure 4:
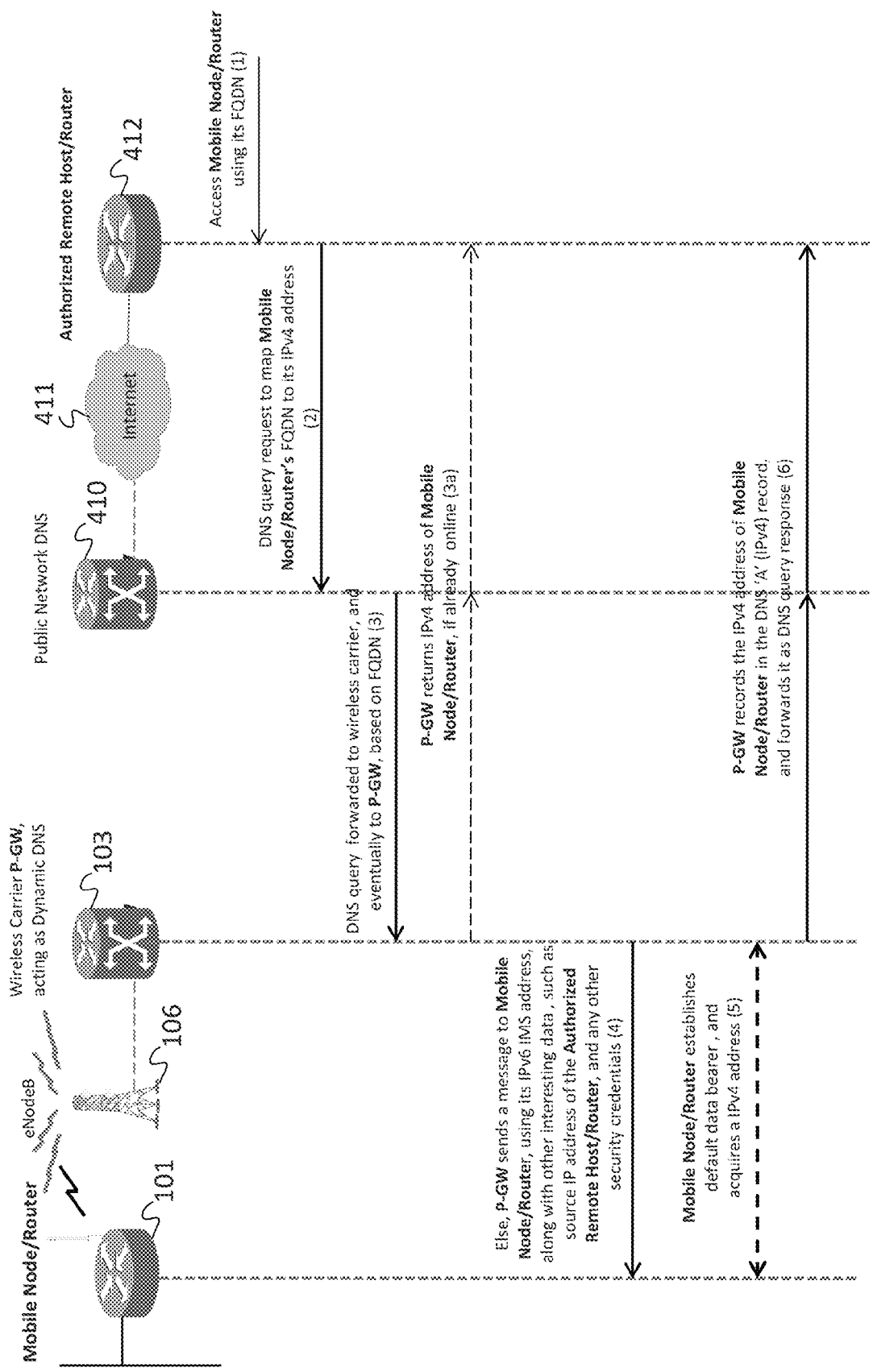
FIG. 4 illustrates an example timing diagram for managed access to the mobile node.

FIG. 4 illustrates an example timing diagram for managed access with the mobile device 101. The process begins on the right of the timing diagram at the remote host or remote router 412. At stage (1), the remote router 412 attempts to initiate a communication session with the mobile device 101 by generating a request including the FQDN of the mobile device 101.

At stage (2), the remote router 412 may employ the services of a public DNS server 410 by sending the request to the DNS hierarchy of the Internet 411. The request includes the domain name of the mobile device 101 and the source IP address of the remote router 412.

At stage (3), the public DNS server 410 does not return any results for the address of the mobile device 101. The public DNS server 410 forwards the DNS query to the relevant service provider. Eventually, the DNS query reaches the gateway 103, which acts as a dynamic DNS server.

At stage (3a), the gateway 103 queries the database to determine whether an IPv4 data bearer has already been established. If the IPv4 data bearer has already been established for the mobile device 101, then the mobile device 101 is already online. Accordingly, the gateway 103 returns the IPv4 address to the remote router 412.

The gateway 103 may also perform an authorization check on the remote router 412 to prevent rogue access to the mobile device 101. The authorization check may occur before or after the gateway 103 determines what data bearers have been established. A list of authenticated hosts may be stored in database 219 or external to the gateway 103, for example, at the HSS. The gateway 103 checks the source IP of the remote router 412 against the list of authenticated hosts and generates a flag or other data to indicate that the remote host has been authenticated. Alternatively, the list of authenticated hosts may be stored at the mobile device 101 and the mobile device 101 may be configured to generate the flag or other data to indicate that the remote host has been authenticated.

In addition, the list of authenticated hosts may specify a level of authentication. For example, different remote hosts may be given different levels of access. A low level of access may be assigned to all requesting remote hosts that allow only incoming calls or texts. A medium level of access may be assigned to known remote hosts that allows any IP services but does not allow the remote host to change the configuration of the mobile device 101. A high level of access may be assigned to administrators that allows control and management of the mobile device 101 including configuration settings and software changes to the mobile device 101. The list of authenticated hosts may specify an access level for each remote host, and the gateway 103 may generate access level data for the remote host that initiated the communication request.

The gateway 103 may generate temporary security credentials for the remote host based on the list of authenticated hosts. The temporary security credentials authorize remote management of the mobile device 101 by the remote host. The temporary security credentials may be stored on database 219 or externally, such as on HSS 113.

Alternatively, the gateway 103 may include a policy engine to indicate to the mobile node the type of data than can be sent to the requesting remote entity. Policy and charging rules function (PCRF) determines policy rules in the carrier network 106.

At stage (4), if the IPv4 data bearer has not been established, indicating that the mobile device 101 is not already online, the gateway 103 access the IPv6 address associated with the mobile device 101. The gateway 103 generates a wake up message including the IPv6 address and sends the wake up message to the mobile device 101. The wake up message may include one or more of an authentication flag, access level data, temporary security credentials and/or policy data as described above.

At stage (5), the mobile device 101 receives the wake up message and requests an IPv4 address from the carrier network 106 to establish the IPv4 data bearer. If the remote host is not authorized for data communication with the mobile device 101, or not authorized for the requested level of data communication, the mobile device 101 declines or blocks the wake up message. Accordingly, the mobile device 101 may generate an error message, which is transmitted directly to the remote host or indirectly by way of the gateway 103. Alternatively, the gateway 103 may generate the error message based on the list of authenticated hosts or other policies and transmit the error message to the remote host.

At stage (6), if the remote host is sufficiently authenticated, the gateway 103 records the IPv4 address of the mobile device 101 in the DNS A record of the database. The gateway 103 also forwards the IPv4 address as a DNS query response to the public DNS server 410. The public DNS server 410 forwards the IPv4 to the remote router 412. The remote router 412 can now communicate with the mobile device 101. The remote router 412 may access, manage, configure, or retrieve data from the mobile device 101.

Figure 5:
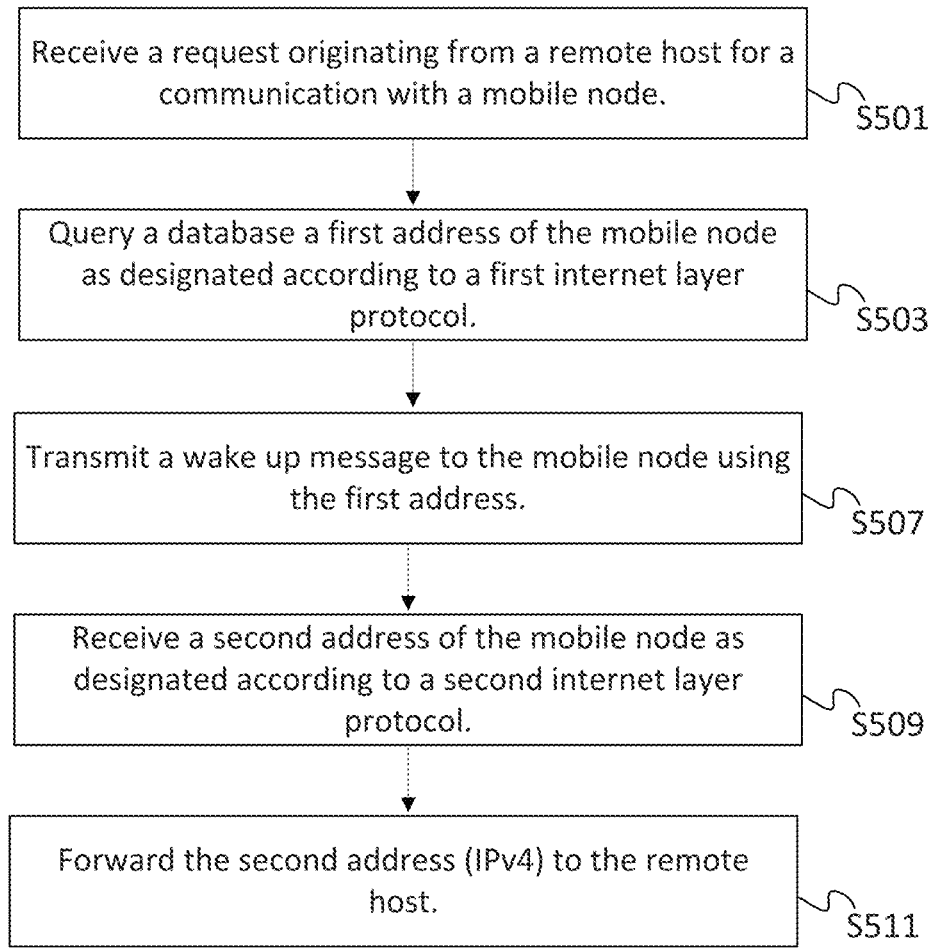
FIG. 5 illustrates an example flow chart for the operation of the gateway of FIG. 1 or FIG. 2.

FIG. 5 illustrates an example flow chart for the operation of the gateway of FIG. 1 or FIG. 2. At act S501, the controller 213 receives a request originating from a remote host for a communication with a mobile node. The request may be a session initiation protocol (SIP) or other type of Internet Multimedia System (IMS) call. The request may be software or patch upload for the mobile node or any device connected behind the mobile node. The mobile node may be a user device such as a smart phone or a network device such as a mobile router.

At act S503, the controller 213 processes the request from the remote host to identify the domain name of the mobile node. The domain name is a publicly available static address of the mobile node such as the FQDN. The domain name is indexed in the database 219 (or an external database) with one or more IP addresses. If the IPv4 address of the mobile node is included in the database 219, the controller 213 generates a response message for the remote host including the IPv4 address. If the IPv4 address of the mobile node is not included in the database 219, the controller 213 access the IPv6 address for the mobile node. The IPv6 address is generally always present because IMS-IPv6 bearer on a mobile device is permanently on and reachability with the carrier network 106 is maintained at all times.

At act S507, the controller 213 generates a wake up message for the mobile node. The wake up message, at a minimum, includes a command to the mobile device to establish an IPv4 data bearer. In addition, the wake up message may include the source IP address of the remote host and authentication data. The authentication data may indicate an authorized security level of the remote host or temporary security credentials.

At act S509, the controller 213 receives the IPv4 address of the mobile node. The controller 213 may store the IPv4 address of the mobile node in the database 219 and/or transmit the IPv4 address to the public DNS server 410. The controller 213 generates a response message including the IPv4 address and at act 5511 forward the response message and the IPv4 address to the remote host.

The embodiments described above manage access by leveraging the always on nature of IPv6 data bearer to wake up a mobile device and establish an IPv4 data bearer. Once the IPv4 data bearer is established any IP services are available to the remote host and mobile node. The services may be user services such as VOiP, software update services, data retrieval services, or configuration services.

Various embodiments described herein can be used alone or in combination with one another. The foregoing detailed description has described only a few of the many possible implementations of the present embodiments. For this reason, this detailed description is intended by way of illustration, and not by way of limitation.

The invention claimed is:

1. A method, comprising:
  receiving, at a network gateway device, a request originating from a remote host, the request including a domain name of a mobile node;
  querying a database for a first address of the mobile node using the domain name, the first address designated according to a first interconnection protocol;
  communicating an indication of the remote host to the mobile node using the first address;
  receiving a second address of the mobile node subsequent to the communicating of the indication of the remote host to the mobile node, the second address designated according to a second interconnection protocol; and
  communicating the second address to the remote host so that the remote host can communicate with the mobile node using the second address.

2. The method of claim 1, wherein the first interconnection protocol and the second interconnection protocol are different versions of an internet layer protocol.

3. The method of claim 1, wherein the first interconnection protocol includes IPv6 and the second interconnection protocol includes IPv4.

4. The method of claim 1, wherein the request originating from the remote host is received from a public domain name system (DNS) server.

5. The method of claim 1, wherein the request includes a session initiation protocol (SIP) call.

6. The method of claim 1, wherein the request includes an Internet Multimedia System (IMS) call.

7. The method of claim 1, wherein the domain name of the mobile node is a publically available static address of the mobile node.

8. The method of claim 1, wherein the domain name is indexed in the database with the first address and the second address.

9. The method of claim 1, wherein the first address of the mobile node is permanently available as a data bearer.

10. The method of claim 1, wherein communicating using the first address includes communicating a command to establish a data bearer of the second interconnection protocol.

11. The method of claim 1, wherein communicating using the first address includes communicating authentication data.

12. The method of claim 11, wherein the authentication data includes an indication of an authorized security level of the remote host.

13. The method of claim 11, wherein the authentication data includes temporary security credentials of the remote host.

14. A network device, comprising:
  database circuitry configured to query a database for a first address of a mobile node, a second address of the mobile node, or both using a domain name of the mobile node, the first address associated with a first interconnection protocol and the second address associated with a second interconnection protocol; and
  communication interface circuitry communicatively coupled to the database circuitry, configured to:
    receive a request from a remote host to communicate with the mobile node, the request including the domain name;
    transmit a message indicating the request to the mobile node using the first address, the message including a command to establish a data bearer through the second address; and
    transmit the second address to the remote host so that the remote host can communicate with the mobile node using the second address.

15. The network device of claim 14, wherein the first interconnection protocol and the second interconnection protocol are different versions of an internet layer protocol.

16. The network device of claim 14, wherein the first interconnection protocol includes IPv6 and the second interconnection protocol includes IPv4.

17. The network device of claim 14, wherein the message includes authentication data, the authentication data including an authorized security level of the remote host, temporary security credentials of the remote host, or both.

18. A system, comprising:
  a network gateway device;
  output circuitry configured to transmit a request to communicate with a mobile node to the network gateway device, the request including a domain name of the mobile node, and the network gateway device configured to:

query a database for a first address of the mobile node using the domain name, the first address designated according to a first interconnection protocol; and communicate a message to the mobile node using the first address, the message including a command to establish a data bearer through a second address of the mobile node, the second address designated according to a second interconnection protocol; and input circuitry configured to receive the second address so to communicate with the mobile node using the second address.

19. The system of claim 18, wherein the request includes a session initiation protocol (SIP) call.

20. The system of claim 18, wherein the request includes an Internet Multimedia System (IMS) call.

\* \* \* \* \*